United States Patent [19]

Braner et al.

[11] 4,212,218

[45] Jul. 15, 1980

[54] SLITTER HAVING LIFTABLE PIVOTED MULTIPLE SPACED PAIRS OF ARBORS

[75] Inventors: Harold R. Braner, River Grove; Douglas S. Matsunaga, Vernon Hills, both of Ill.

[73] Assignee: Braner Enterprises, Inc., Schiller Park, Ill.

[21] Appl. No.: 937,450

[22] Filed: Aug. 28, 1978

[51] Int. Cl.[2] .......................... B23D 19/06; B26D 1/24
[52] U.S. Cl. .......................................... 83/479; 83/481; 83/564
[58] Field of Search ................. 83/479, 480, 481, 563, 83/564

[56] References Cited

U.S. PATENT DOCUMENTS

| Re. 27,918 | 2/1974 | Montguire | 83/479 |
| 3,197,992 | 8/1965 | Taniguchi | 83/479 X |
| 3,408,886 | 11/1968 | David | 83/479 X |
| 3,727,503 | 4/1973 | Braner et al. | 83/479 |

FOREIGN PATENT DOCUMENTS 2306296  2/1973  Fed. Rep. of Germany ............. 83/479

Primary Examiner—J. M. Meister
Attorney, Agent, or Firm—Oltsch, Knoblock & Hall

[57] ABSTRACT

A slitter having a pivotal head carrying multiple spaced pairs of arbors with said head being liftable to displace the arbors from the pass line of the material.

7 Claims, 4 Drawing Figures

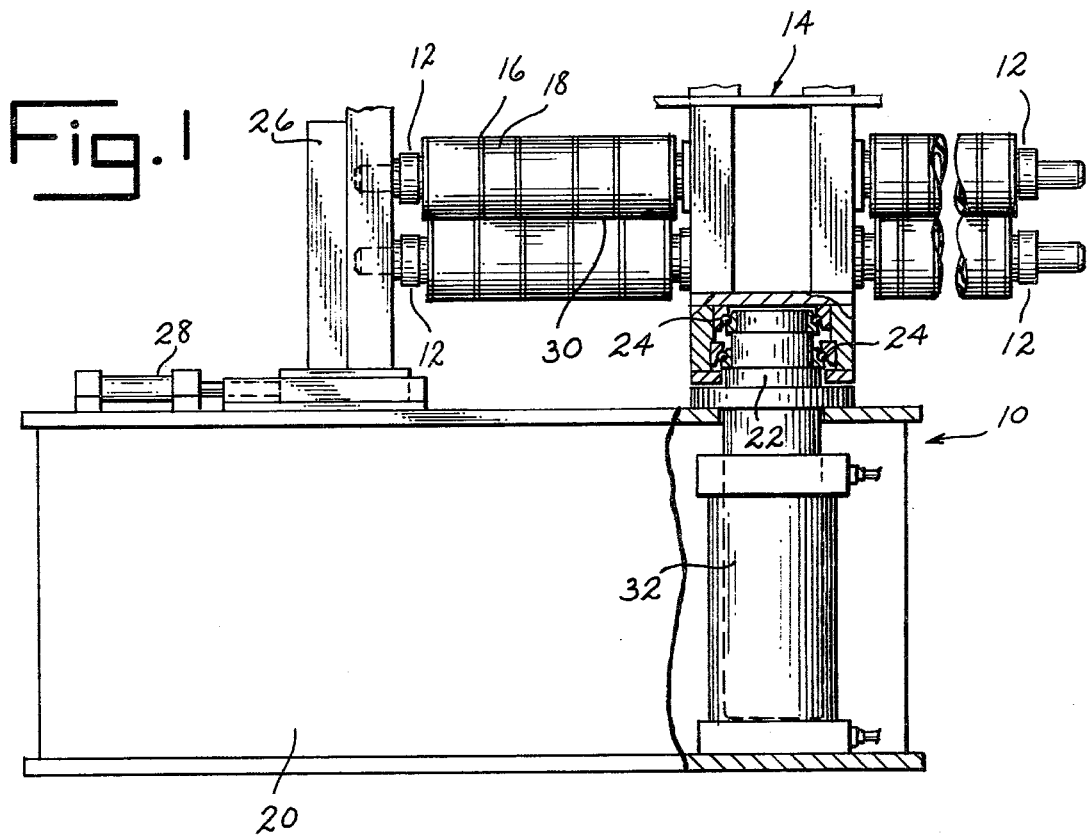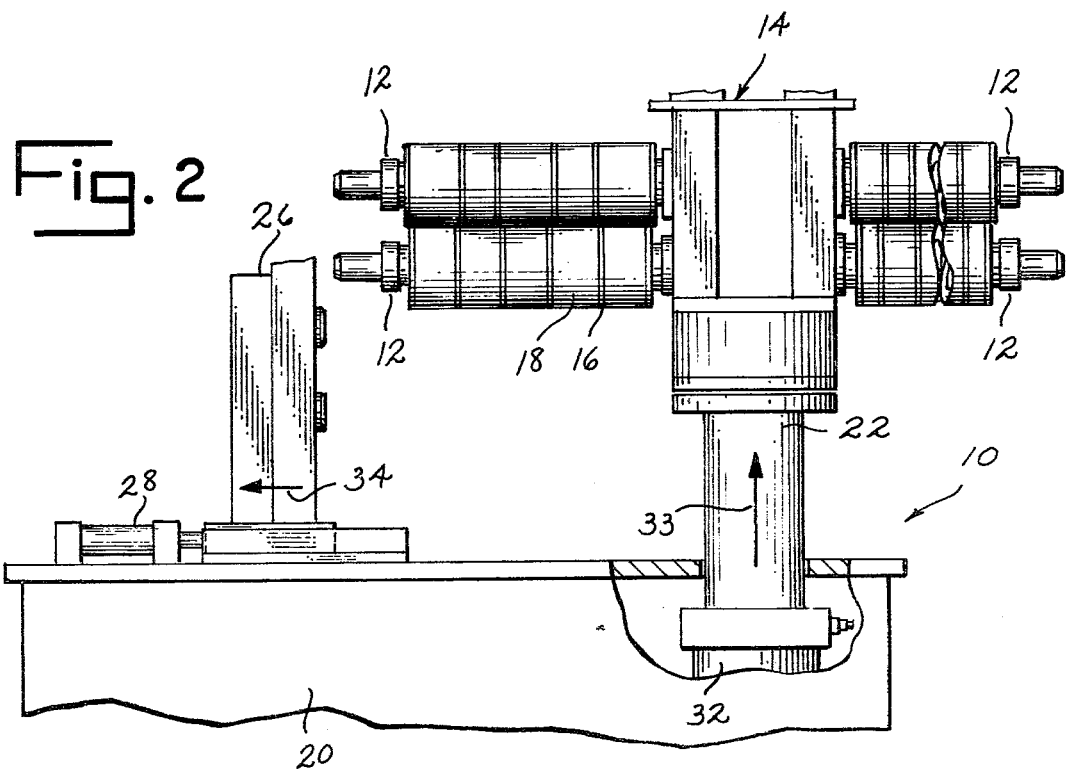

SLITTER HAVING LIFTABLE PIVOTED MULTIPLE SPACED PAIRS OF ARBORS

SUMMARY OF THE INVENTION

This invention relates to a slitter in which the head thereof carries multiple pairs of arbors and is liftable so as to displace a selected pair of arbors from the pass line of the material through the slitter.

The slitter of this invention utilizes the head arrangement illustrated in U.S. Pat. Nos. RE 27,918 and 3,727,503. Incorporated into the housing for the multiple arbor slitter head is a lift mechanism by which the pairs of arbors can be raised as a unit to a level above the pass line of the material so as to clear the pinch and guide rollers. The slitter head may be pivoted in its raised position to allow a pre-assembled set of arbors to be rotated into position over the pass line of the material with the head subsequently being lowered to position the pre-assembled arbors within the material pass line. In this manner the advantages of multiple arbor slitters allowing for the pre-assembly of cutters can be obtained without the necessity of designing the pinch rollers for pivoted movement which is normally required to avoid contact with the arbors during pivotal movement of the head. Additionally, with the lifting of the slitter head, the drive for the slitter arbors can be simplified from that disclosed in U.S. Pat. No. RE 27,918.

Accordingly, it is the object of this invention to provide a slitter having multiple pairs of arbors in which the pairs of arbors are carried for rotation about a vertical axis and are designed to be lifted or lowered relative to the slitter frame.

Another object of this invention is to provide a slitter having pivotal multiple spaced pairs of arbors which are shiftable as a unit into a position above the pass line of the material through the slitter.

Still another object of this invention is to provide a slitter which has multiple pairs of spaced arbors mounted for rotation upon a head about a vertical axis and which includes means for connecting one arbor of each pair to a drive mechanism upon lowering movement of the slitter head.

Other objects of this invention will become apparent upon the reading of the following description of the invention.

BRIEF DESCRIPTION OF THE DRAWINGS

FIG. 1 is a fragmentary view of one embodiment of the slitter showing portions thereof in sectional form for purposes of illustration and having its slitter head in lowered operative position.

FIG. 2 is a fragmentary view of the slitter of FIG. 1 showing the slitter head in its raised position.

DESCRIPTION OF THE PREFERRED EMBODIMENTS

Figure 3:
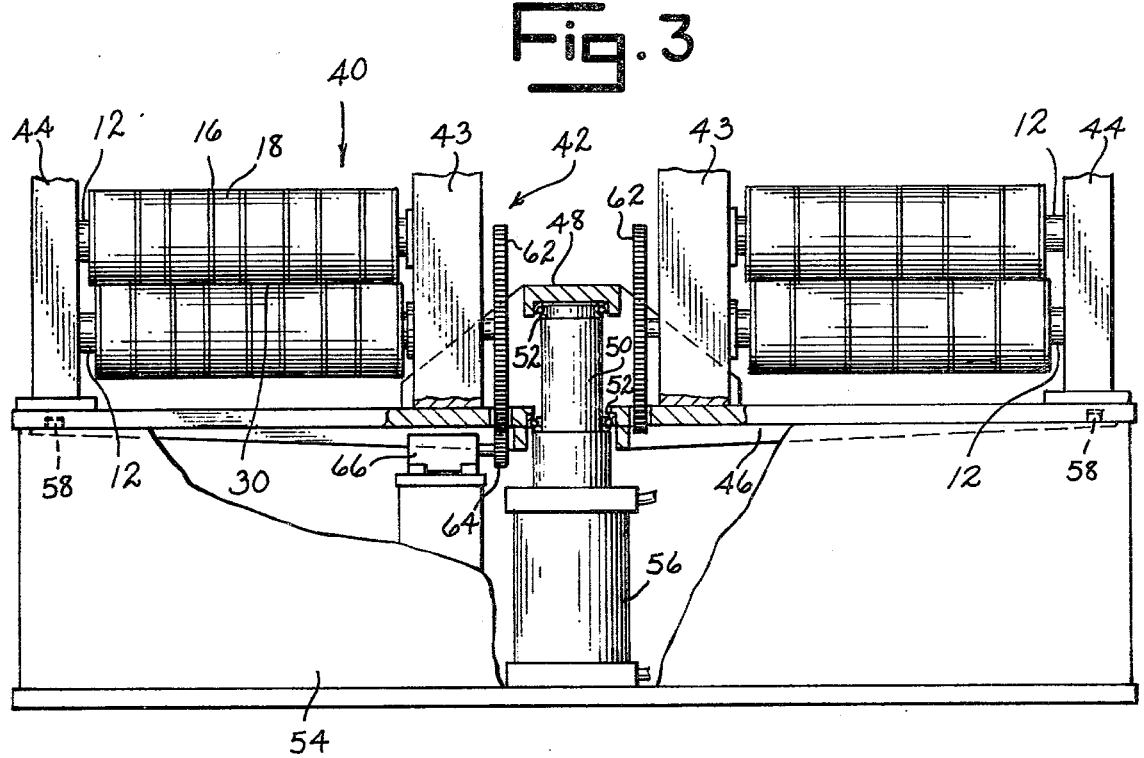
FIG. 3 is a fragmentary view of another embodiment of the slitter showing portions thereof in sectional form for purposes of illustration and having its slitter head in a lower operative position.

The preferred embodiments illustrated are not intended to be exhaustive or to limit the invention to the precise forms disclosed. They are chosen and described in order to best explain the invention and its application and practical use to thereby enable others skilled in the art to best utilize the invention.

Referring to the embodiment of the slitter 10 shown in FIGS. 1 and 2, multiple pairs of arbors 12 are supported and journaled each at one end by a bearing housing 14. Arbors 12 include removable cutters 16 and spacers 18. Bearing housing 14 is carried by a base or frame 20. Frame 20 includes a post 22 upon which bearing housing 14 is supported by bearing members 24 so that housing 14 is pivotal relative to the frame about a generally vertical axis with arbors 12 being shiftable in circling fashion in generally horizontal planes.

A bearing housing 26 is also carried by frame 20 and is shiftable between guides toward and away from bearing housing 14 upon actuation of hydraulic cylinder 28. Bearing housing 26 is adapted when shifted towards bearing housing 14 to support and journal the free ends of Bearing housing 26 may include suitable gearing which are motor driven for the purpose of rotating at least one of the journaled pair of arbors 12. Slitter 10 in FIGS. 1 and 2 will also include jack screws (not shown) which are used to separate the arbors 12 of each pair of arbors for the purpose of assembling cutters 16 and spacers 18 and for providing sufficient overlap between the cutters to effect the slitting operation. The location 30 between arbors 12 journaled within bearing housing 26 defines the pass line of the elongated sheet material as it passes through the slitter and is reduced to strips of selected width.

Slitter 10 as thus far described is similar in operation and generally similar in construction to that disclosed in U.S. Pat. No. 3,727,503 incorporated herein by reference. Post 22 forms part of a piston housed within a hydraulic cylinder 32 located within frame 20. Actuation of cylinder 32 causes the extension of post 22 as indicated by arrow 33 and the raising of bearing housing 14 to elevate arbors 12 as illustrated in FIG. 2. Prior to the raising of post 22, bearing housing 26 is shifted as indicated by arrow 34 away from bearing housing 14 to free the ends of the formerly supported arbors 12. With post 22 in its elevated or raised position as illustrated in FIG. 2, bearing housing 14 can be rotated relative to the post to swing a pre-assembled pair of arbors 12 into a position overlying the pass line of the slitter in preparation for the next slitting operation. Post 22 is then lowered into the position shown in FIG. 1 and bearing housing 26 shifted towards bearing housing 14 to support and journal the newly positioned pair of pre-assembled arbors.

Figure 4:
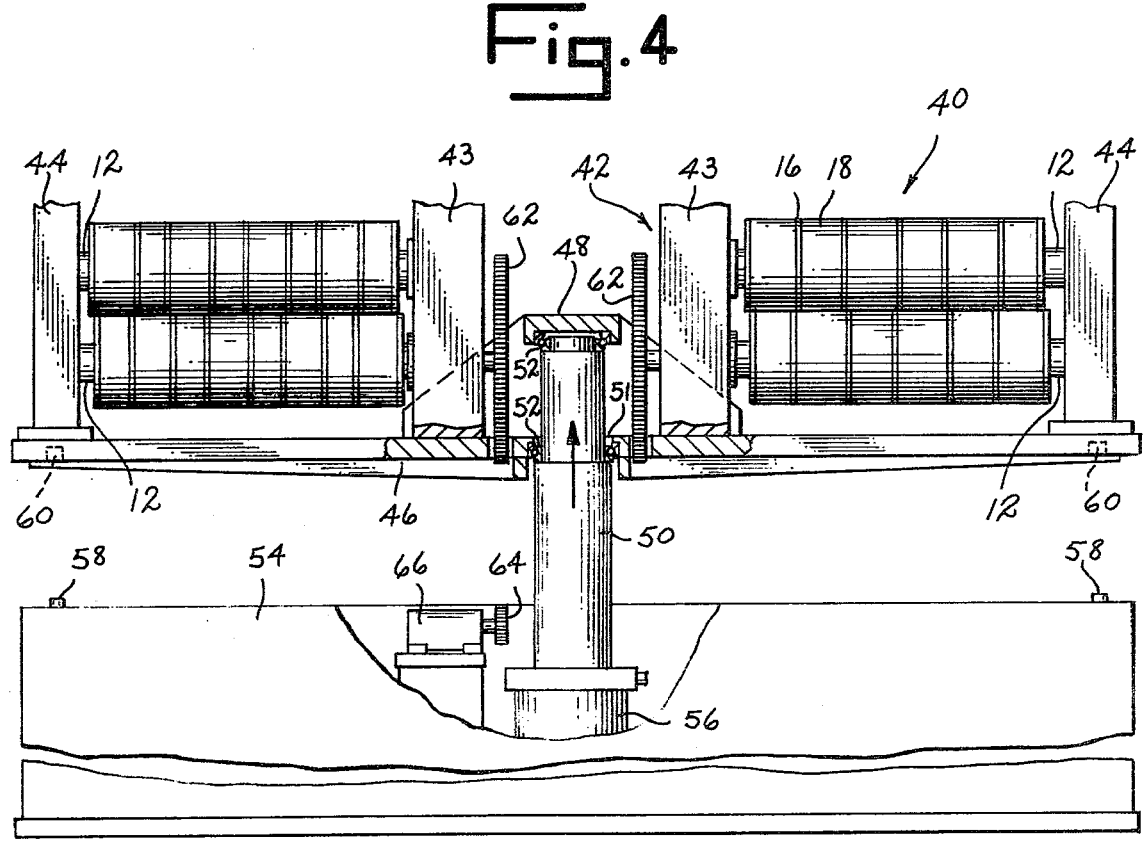
FIG. 4 is a fragmentary view like that of FIG. 3 but showing the slitter head in its raised position.

In the embodiment of the slitter 40 shown in FIGS. 3 and 4 multiple pairs of arbors 12 are shown. Each pair of arbors 12 is supported and journaled for rotary movement between a bearing block 43, which is a part of the central bearing housing 42, and a bearing housing 44. Each associated bearing block 43 and housing 44 are carried upon an underlying support member 46. Bearing housings 44 are removable to allow assembly and disassembly of cutters 16 and spacers 18 carried upon the arbors. Associated with each bearing block 43 and housing 44 will be a jack screw (not shown) for the purpose of varying the distance between arbors 12. Support member 46 includes a gusset-supported abutment plate 48 which is located between the spaced bearing blocks 43. A post 50 extends through a lower opening 51 in support member 46 which is centered between bearing blocks 43 and makes supporting contact with abutment plate 48 through a bearing member 52. An additional bearing member 52 serves to make supporting contact between support member 46 about its lower center opening 51 and post 50. Post 50 is carried within a base or frame 54. As thus far described slitter 40 is generally similar in operation as that found in U.S. Pat. No. RE 27,918, incorporated herein by reference.

Post 50 is part of a piston housed within a hydraulic cylinder 56 located within frame 54. Upon actuation of cylinder 56, post 50 is elevated or raised as illustrated in FIG. 4 to locate support member 46 in an elevated position relative to frame 54.

With post 50 in its raised position, support member 46 can be rotated about a generally vertical axis causing arbors 12 to shift in circular fashion in generally horizontal planes.

In FIG. 3, location 30 between one pair of arbors 12 represents the pass line of the material through the slitter. When one slitting operation is completed, the remaining pair of arbors 12 which have been pre-assembled with cutters 16 and spacers 18 can be swung over the material pass line with post 50 in its elevated position. Post 50 is then lowered to allow the pre-assembled set of arbors 12 and support member 46 to be lowered with the support member preferably coming to rest upon frame 54. Rotational movement of support member 46 and its supported bearing housings 42 and 44 and arbors 12 is prevented by pins 58 which are carried at the upper surface of frame 54 and which fit into aligned openings 60 in support member 46.

In slitter 40 the rotation of at least one arbor of each pair of arbors 12 is accomplished by extending the end of the lowermost arbor of each of the pairs of arbors through its supporting bearing block 43 and securing a gear 62 to the arbor end. The toothed periphery of each gear 62 extends through a slot in support member 46. A drive gear 64 connected to a motor 66 is located within frame 54. Drive gear 64 is aligned with gear 62 of a pair of arbors 12 when the arbors are located over pass line 30 of the slitter with support member 46 in its raised position. The peripheral edge of aligned gear 62, when post 50 is lowered with support member 46 being located in its lowermost position, makes interlocking contact with drive gear 64 as illustrated in FIG. 3 so that upon rotation of gear 64 through actuation of motor 66, gear 62 will be rotated and at least one arbor 12 rotated at pass line 30. Therefore, in the embodiment of the slitter 40 shown in FIGS. 3 and 4, when post 50 is shifted from its raised into its lowered position not only is a selected pre-assembled pair of arbors 12 positioned at pass line 30 of the slitter but the drive for those particular arbors is engaged through the contact of gears 62 and 64. Motor 66 is clutched to enable the arbors 12 at the pass line to be either driven or free running.

In each of the embodiments illustrated in FIGS. 1 and 2 and FIGS. 3 and 4, the pairs of arbors 12 are shifted sufficiently high so that the arbors and all supporting components of the slitter for the arbors will clear any pinch roller or other guide means utilized in conjunction with the slitter as the arbors are rotated in generally horizontal planes.

It is to be understood that in designing the illustrated embodiments of slitters 10 and 40 the number of pairs of arbors which are supported for horizontal rotational movement can vary in number.

It is to be understood that the invention is not to be limited to the details above given but may be modified within the scope of the appended claims.

What we claim is:

1. A slitter for cutting sheet material extending along a pass line into strips comprising
    a frame,
    a first housing,
    multiple spaced pairs of arbors carried by said first housing and extending outwardly thereof,
    means for shifting said first housing between upper and lower positions whereby said spaced arbors are raised out of and lowered into the plane of said material pass line as a unit relative to said frame,
    means pivotally connecting said first housing to said frame for rotative movement about a generally vertical axis when said first housing is in its upper position whereby a selected one of said pairs of arbors may be vertically aligned with said material pass line for movement into the pass line when said first housing is shifted into its lower position, and
    a second housing for supporting said selected one pair of arbors when positioned in said material pass line.

2. The slitter of claim 1 wherein said pivot connecting means for said first housing is for rotating said first housing about said generally vertical axis when said first housing is in its lower position.

3. The slitter of claim 1 wherein said second housing is supported by said frame, means for shifting said second housing into and out of supporting contact with said selected one pair of arbors when positioned in said material pass line.

4. The slitter of claim 1 and a said second housing supporting each of said pairs of arbors, said pivot connecting means including means supporting each of said first and second housings for rotative movement relative to said frame about said generally vertical axis.

5. The slitter of claim 4 and a drive motor carried by said frame and including a drive gear located below said pairs of arbors, each arbor being journaled for rotation within its said supporting first and second housings, one arbor each pair of arbors carrying a driven gear, said driven gear of the one arbor of said selected one pair of arbors engaging said drive gear when said selected one pair of arbors is positioned in said material pass line whereby actuation of said motor will cause rotation of said last mentioned one arbor.

6. The slitter of claim 5 and means for securing said first housing against rotation when in its lower position with said selected one pair of arbors positioned in said material pass line.

7. The slitter of claim 1 and a drive motor carried by said frame and including a drive gear located below said pairs of arbors, each arbor being journaled for rotation when supported by said first and second housings, one arbor each pair or arbors carrying a driven gear, said driven gear of the one arbor of said selected one pair of arbors engaging said drive gear when said selected one pair of arbors is positioned in said material pass line whereby actuation of said motor will cause rotation of said last mentioned one arbor.

* * * * *